United States Patent
Oshima et al.

(10) Patent No.: US 8,129,030 B2
(45) Date of Patent: Mar. 6, 2012

(54) ACRYLIC BLOCK COPOLYMER COMPOSITION AND MOLDED ARTICLE THEREOF

(75) Inventors: Hiroshi Oshima, Kamisu (JP); Toyoaki Kurihara, Kamisu (JP); Akiko Ide, Chiyoda-ku (JP); Kenichi Hamada, Kamisu (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 177 days.

(21) Appl. No.: 12/532,638

(22) PCT Filed: Mar. 26, 2008

(86) PCT No.: PCT/JP2008/055758
§ 371 (c)(1),
(2), (4) Date: Sep. 23, 2009

(87) PCT Pub. No.: WO2008/123316
PCT Pub. Date: Oct. 16, 2008

(65) Prior Publication Data
US 2010/0119797 A1 May 13, 2010

(30) Foreign Application Priority Data
Mar. 26, 2007 (JP) .................. 2007-079195

(51) Int. Cl.
*B32B 27/30* (2006.01)
*B32B 27/36* (2006.01)
*C08L 53/00* (2006.01)
*C08L 67/02* (2006.01)

(52) U.S. Cl. ....... 428/480; 525/88; 525/92 R; 525/92 E; 525/92 F; 525/94

(58) Field of Classification Search .............. 525/94, 525/88, 92 R, 92 E, 92 F; 428/480
See application file for complete search history.

(56) References Cited

U.S. PATENT DOCUMENTS

| | | | |
|---|---|---|---|
| 4,897,298 A * | 1/1990 | Otawa et al. .................. 428/122 |
| 5,668,231 A | 9/1997 | Varshney et al. | |
| 6,878,789 B2 | 4/2005 | Uchiumi et al. | |
| 2003/0191243 A1 | 10/2003 | Hamada et al. | |
| 2004/0147674 A1 | 7/2004 | Kakeda et al. | |
| 2005/0234199 A1 * | 10/2005 | Taniguchi et al. ............ 525/242 |
| 2006/0036030 A1 | 2/2006 | Kurihara et al. | |

FOREIGN PATENT DOCUMENTS

| | | |
|---|---|---|
| EP | 1 669 406 A1 | 6/2006 |
| JP | 6-93060 | 4/1994 |
| JP | 7-25859 | 3/1995 |
| JP | 2817879 | 8/1998 |
| JP | 11-335432 | 12/1999 |
| JP | 2003 277574 | 10/2003 |
| JP | 2005 264069 | 9/2005 |
| JP | 2006 225413 | 8/2006 |
| JP | 2006-225413 | 8/2006 |
| WO | 2004 041886 | 5/2004 |

OTHER PUBLICATIONS

Georges Moineau, et al., "Synthesis of fully acrylic thermoplastic elastomers by atom transfer radical polymerization (A$^-$RP), 2$^a$", "Effect of the catalyst on the molecular control and the rheological properties of the triblock copolymers", Macromolecular Chemistry and Physics, vol. 201, No. 11, 2000, pp. 1108-1114.

* cited by examiner

*Primary Examiner* — Jeffrey Mullis
(74) *Attorney, Agent, or Firm* — Oblon, Spivak, McClelland, Maier & Neustadt, L.L.P.

(57) ABSTRACT

[PROBLEMS] To provide a polymer composition that simultaneously has excellent paintability and high oil resistance and is also excellent in thin-wall moldability and flexibility; and a molded article produced by injection-molding of the composition and being suitable for composite-molded grips, automotive interior and exterior trims, and so on. [MEANS FOR SOLVING PROBLEMS] A polymer composition and a molded article that are comprising 33 to 67% by mass of a polybutylene terephthalate-based resin (A) and 67 to 33% by mass of an acrylic block copolymer (B); and in the acrylic block copolymer (B), two polymer blocks (b2) comprising a unit of methacrylic ester such as methyl methacrylate are bonded to the both ends of a polymer block (b1) comprising a unit of acrylic ester such as butyl acrylate, the total mass of the polymer block (b2) is 20 to 35% by mass with respect to the acrylic block copolymer (B), the weight-average molecular weight is 50000 to 100000, and the order-disorder transition temperature is 180 to 230° C.

17 Claims, No Drawings

ACRYLIC BLOCK COPOLYMER COMPOSITION AND MOLDED ARTICLE THEREOF

TECHNICAL FIELD

The present invention relates to a polymer composition that simultaneously exhibits excellent paintability and high oil resistance and is also excellent in thin-wall moldability and flexibility, and relates to a molded article comprising the polymer composition. The molded article can be used in grip materials, for example, commodities, stationery, home-use electric appliances, and sporting goods. In addition, the molded article can be used in automotive interior and exterior trims, for example, door handles, side garnishes, instrument panels, console boxes, door trims, and bumpers. Furthermore, the molded article can be used in electric and electronic parts, for example, connectors, switch covers, housings, and containers. The molded article can be thus widely used in various fields.

BACKGROUND ART

Polybutylene terephthalate-based resins are excellent in chemical resistance, heat resistance, and mechanical properties and are widely used as industrial resins. However, they are crystalline and are thereby poor in flexibility and paintability, resulting in limitation of the purpose of use. Accordingly, it is proposed a method (Patent Document 1) for imparting flexibility to a polybutylene terephthalate-based resin by adding a small amount (less than 10% by mass) of a thermoplastic elastomer, while maintaining the original characteristics of the polybutylene terephthalate-based resin, but the resulting flexibility is insufficient. In addition, it is proposed a composition (Patent Document 2) having enhanced rubber elasticity and flexibility by blending a rubber softener and a hydrogenated derivative of a block copolymer consisting of a special monovinyl-substituted aromatic hydrocarbon and a conjugated diene to a polyester elastomer composed of a block copolymer consisting of an aromatic polyester and a polyether, but the enhancement of both the paintability and the oil resistance is still insufficient. Thus, a polymer or a polymer composition that has both sufficient paintability and sufficient oil resistance and also can provide a molded article excellent in flexibility has not been currently obtained.

[Patent Document 1] Japanese Unexamined Patent laid-open No. 2006-225413
[Patent Document 2] Japanese Patent No. 2817879

DISCLOSURE OF INVENTION

Problems to be Solved by the Invention

It is an object of the present invention to provide a polymer composition having both sufficient paintability and sufficient oil resistance and also being excellent in thin-wall moldability and flexibility, and to provide a molded article composed of the polymer composition.

Means for Solving the Problems

The present inventors have conducted studies and, as a result, have found the fact that a polymer composition and a molded article that fulfill the above-mentioned object can be obtained by mixing a polybutylene terephthalate-based resin and an acrylic block copolymer obtained by bonding two polymer blocks comprising a methacrylic ester unit to the both ends of a polymer block comprising an acrylic ester unit and having a specific relatively low molecular weight, and have accomplished the present invention.

That is, the present invention relates to a polymer composition containing 33 to 67% by mass of a polybutylene terephthalate-based resin (A) and 67 to 33% by mass of an acrylic block copolymer (B), wherein
the polybutylene terephthalate-based resin (A) has a melt flow rate of 10 to 40 g/10 min; and
in the acrylic block copolymer (B),
the weight-average molecular weight is 50000 to 100000,
the block structure is a triblock structure in which two polymer blocks (b2) comprising a methacrylic ester unit are bonded to the both ends of a polymer block (b1) comprising an acrylic ester unit,
the total mass of the polymer block (b2) is 20 to 35% by mass with respect to the acrylic block copolymer (B),
the order-disorder transition temperature is 180 to 230° C., and
the morphology in the polymer composition is a continuous phase.

Furthermore, the present invention relates to a process of producing the polymer composition by melt-kneading a polybutylene terephthalate-based resin (A) and an acrylic block copolymer (B) at a temperature equal to or higher than the order-disorder transition temperature of the acrylic block copolymer (B).

Furthermore, the present invention relates to a molded article comprising the polymer composition and relates to a laminate including a layer composed of the polymer composition and a layer composed of a hard resin.

Advantages

The polymer composition of the present invention is excellent in fluidity when melting and is good in molding processability, in particular, thin-wall moldability, and therefore various molding processes including injection molding can be applied thereto for producing molded articles with various shapes. Furthermore, the molded article comprising the polymer composition of the present invention is excellent in paintability, oil resistance, and flexibility and therefore can be used in grip materials, for example, commodities, stationery, home-use electric appliances, and sporting goods and also can be used in automotive interior and exterior trims, for example, door handles, side garnishes, instrument panels, console boxes, door trims, and bumpers. Furthermore, the molded article can be used in electric and electronic parts, for example, connectors, switch covers, housings, and containers. The molded article can be thus widely used in various fields and is useful for various purposes.

BEST MODES FOR CARRYING OUT THE INVENTION

Embodiments of the present invention will be described in detail below. The polymer composition constituting the present invention contains a polybutylene terephthalate-based resin (A) and an acrylic block copolymer (B) in which two polymer blocks (b2) comprising a methacrylic ester unit are bonded to the both ends of a polymer block (b1) comprising an acrylic ester unit.

The polybutylene terephthalate-based rein (A), which is a first blended component in the present invention, is a polyester mainly composed of a 1,4-butanediol unit and a terephthalic acid unit and may contain a small amount of other constitutional units such as a diol unit other than the 1,4- butanediol unit, a dicarboxylic acid unit other than the terephthalic acid unit, a hydroxycarboxylic acid unit, or a lactone unit, as long as the main constitutional units are the 1,4-butanediol unit and the terephthalic acid unit. If the main diol unit is one having three or less carbon atoms, such as a polyethylene terephthalate-based resin, the melting point of the resin is too high with respect to the acrylic block copolymer (B), resulting in difficulty to compatibility of each other.

The polybutylene terephthalate-based resin (A) has melt fluidity (MFR: at 250° C., a 2.16 kg load) of 10 to 40 g/10 min and preferably 20 to 40 g/10 min. In the present invention, the amount of the polybutylene terephthalate-based resin (A) is 33 to 67% by mass and preferably 33 to 50% by mass with respect to the mass of the polymer composition. In such a case, the performance is mainly derived from the polybutylene terephthalate-based resin (A), and the oil resistance is enhanced.

The acrylic block copolymer (B), which is a second blended component in the present invention, is constituted by bonding two polymer blocks (b2) comprising a methacrylic ester unit to the both ends of a polymer block (b1) comprising an acrylic ester unit. The amount of the acrylic ester unit in the polymer block (b1) and the amount of the methacrylic ester unit in the polymer block (b2) are not particularly limited, as long as they are the main components, and are each preferably in a range of 60 to 100% by mass and more preferably in a range of 80 to 100% by mass.

In the acrylic block copolymer (B), the polymer block (b1) whose main component is an acrylic ester unit is a polymer block mainly constituted of an acrylic ester unit. Examples of the acrylic ester for forming the polymer block include, but are not limited to, methyl acrylate, ethyl acrylate, n-propyl acrylate, isopropyl acrylate, n-butyl acrylate, isobutyl acrylate, sec-butyl acrylate, tert-butyl acrylate, amyl acrylate, isoamyl acrylate, n-hexyl acrylate, cyclohexyl acrylate, 2-ethylhexyl acrylate, pentadecyl acrylate, dodecyl acrylate, isobornyl acrylate, allyl acrylate, phenyl acrylate, benzyl acrylate, phenoxyethyl acrylate, 2-hydroxyethyl acrylate, 2-methoxyethyl acrylate, and glycidyl acrylate, which can be used alone or as a mixture. Among these acrylic esters, alkyl acrylates such as methyl acrylate, ethyl acrylate, isopropyl acrylate, n-butyl acrylate, tert-butyl acrylate, 2-ethylhexyl acrylate, and dodecyl acrylate are preferred from the viewpoints of enhancing, for example, the paintability and the flexibility of the polymer composition, and n-butyl acrylate and 2-ethylhexyl acrylate are further preferred. In addition to the above, another monomer, such as methacrylic ester, methacrylic acid, acrylic acid, an aromatic vinyl compound, acrylonitrile, methacrylonitrile, or olefin, which are described below, may be used as a copolymer component (low-content component) in the range that the desired effect of the present invention is not lost.

In the acrylic block copolymer (B), the polymer block (b2) whose main component is a methacrylic ester unit is a polymer block mainly constituted of a methacrylic ester unit. Examples of the methacrylic ester for forming the polymer block include, but are not limited to, methyl methacrylate, ethyl methacrylate, n-propyl methacrylate, isopropyl methacrylate, n-butyl methacrylate, isobutyl methacrylate, sec-butyl methacrylate, tert-butyl methacrylate, amyl methacrylate, isoamyl methacrylate, n-hexyl methacrylate, cyclohexyl methacrylate, 2-ethylhexyl methacrylate, pentadecyl methacrylate, dodecyl methacrylate, isobornyl methacrylate, allyl methacrylate, phenyl methacrylate, benzyl methacrylate, phenoxyethyl methacrylate, 2-hydroxyethyl methacrylate, 2-methoxyethyl methacrylate, and glycidyl methacrylate, which can be used alone or as a mixture. Among these methacrylic esters, alkyl methacrylates such as methyl methacrylate, ethyl methacrylate, isopropyl methacrylate, n-butyl methacrylate, tert-butyl methacrylate, 2-ethylhexyl methacrylate, cyclohexyl methacrylate, and isobornyl methacrylate are preferred from the viewpoints of enhancing, for example, the paintability and the flexibility of the polymer composition, and methyl methacrylate is further preferred. In addition to the above, another monomer, such as the above-mentioned acrylic ester, methacrylic acid, acrylic acid, an aromatic vinyl compound, acrylonitrile, methacrylonitrile, or olefin, may be used as a copolymer component (low-content component) in the range that the desired effect of the present invention is not lost.

The acrylic block copolymer (B) is constituted of the polymer block (b1) mainly comprising an acrylic ester unit and the polymer block (b2) mainly comprising a methacrylic ester unit. Particularly, it is necessary to use a triblock copolymer in which the polymer blocks (b2) are bonded to the both ends of the polymer block (b1), from the viewpoints of enhancing the flexibility, dynamic physical properties, and molding processability of the polymer composition of the present invention. If the acrylic block copolymer is a diblock copolymer, the melt viscosity thereof is low, and the difference of the melt viscosity from that of the polybutylene terephthalate-based resin (A) is large, which makes it difficult to properly disperse the polybutylene terephthalate-based resin (A).

The weight-average molecular weight of the acrylic block copolymer (B) is necessarily 50000 to 100000. Furthermore, the weight-average molecular weight of the polymer block (b1) that mainly comprises an acrylic ester unit is not necessarily limited, but, in usual, it is preferred to be in a range of 30000 to 80000. Furthermore, the weight-average molecular weight of the polymer block (b2) that mainly comprises a methacrylic ester unit is preferably in a range of 5000 to 20000. When the polymer block (b1), the polymer block (b2), and the acrylic block copolymer (B) have weight-average molecular weights in the above-mentioned low ranges, the order-disorder transition temperature described below is within a specified range, and the resulting polymer composition has excellent thin-wall moldability.

The mass ratio of the polymer block (b1) and the two polymer blocks (b2) constituting the acrylic block copolymer (B) is necessarily 65:35 to 80:20 from the viewpoints of the agglutinative property and flexibility of a molded article. In addition, the molecular weight distribution (Mw/Mn) of the acrylic block copolymer (B) is preferably within a range of 1.0 to 2.0 and more preferably within a range of 1.0 to 1.6 in which the content of low molecular weight polymers that decrease the oil resistance of a polymer composition is significantly low. Furthermore, when the mass ratio of the polymer block (b1) and the polymer block (b2) and the molecular weight distribution of the acrylic block copolymer (B) are within the above-mentioned ranges, the order-disorder transition temperature described below is within a specified range, and the resulting polymer composition has excellent thin-wall moldability.

The acrylic block copolymer (B) may include a functional group, such as a hydroxyl group, a carboxyl group, an acid anhydride, or an amino group, in a molecular chain or at a molecular chain end, according to need.

The acrylic block copolymer (B) used in the present invention is produced by living polymerization of monomers constituting the respective blocks. Examples of the living polymerization include a method by anionic polymerization in the presence of a mineral acid salt, such as an alkali metal or alkaline earth metal salt, using an organic alkali metal compound as a polymerization initiator (see Japanese Examined Patent Publication No. 7-25859); a method by anionic polymerization in the presence of an organic aluminum compound, using an organic alkali metal compound as a polymerization initiator (see Japanese Unexamined Patent laid-open No. 11-335432); a method by polymerization, using an organic rare earth metal complex as a polymerization initiator (see Japanese Unexamined Patent laid-open No. 6-93060); and a method by radical polymerization in the presence of a copper compound, using an α-halogenated ester compound as an initiator (see "Macromol. Chem. Phys.", 2000, Vol. 201, pp. 1108-1114). Other examples include a method of using a polyvalent radical polymerization initiator or a polyvalent radical chain transfer agent for polymerizing monomers constituting the respective blocks, thereby producing a mixture containing the acrylic block copolymer (B). Among these methods, the method by anionic polymerization in the presence of an organic aluminum compound and using an organic alkali metal compound as a polymerization initiator is preferred, because the method makes it possible to yield a block copolymer having a high purity and a narrow molecular weight distribution, i.e., not containing oligomers, which are causes of decreases in paintability and oil resistance of the polymer composition, and high molecular weight copolymers, which are causes of a decrease in flexibility. Typical examples of the organic aluminum compound include isobutyl bis(2,6-di-t-butyl-4-methylphenoxy)aluminum, isobutyl bis(2,6-di-t-butylphenoxy)aluminum, isobutyl bis[2,2'-methylene bis(4-methyl-6-t-butylphenoxy)]aluminum, n-octyl bis(2,6-di-t-butyl-4-methylphenoxy)aluminum, n-octyl bis(2,6-di-t-butylphenoxy)aluminum, n-octyl bis[2,2'-methylene bis(4-methyl-6-t-butylphenoxy)]aluminum, tris(2,6-di-t-butyl-4-methylphenoxy)aluminum, and tris(2,6-diphenylphenoxy)aluminum. Among them, isobutyl bis(2,6-di-t-butyl-4-methylphenoxy)aluminum, isobutyl bis(2,6-di-t-butylphenoxy)aluminum, n-octyl bis(2,6-di-t-butyl-4-methylphenoxy)aluminum, and n-octyl bis(2,6-di-t-butylphenoxy)aluminum are particularly preferred, from the points of, for example, the polymerization activity and the block efficiency.

The order-disorder transition (ODT) temperature of the acrylic block copolymer (B) is within the range of 180 to 230° C. and preferably 190 to 210° C. When the acrylic block copolymer (B) has an order-disorder transition temperature within the range above, the polymer block (b1) and the polymer block (b2) are in disordered states and dissolved in each other by melt-kneading to give an acrylic block copolymer (B) having a low melt viscosity. Therefore, the polybutylene terephthalate-based resin (A) can be well dispersed. On the other hand, when the order-disorder transition temperature is 230° C. or higher, each component of the polymer composition is of inferior dispersibility, which may cause problems such as delamination (surface exfoliation) during molding. In addition, when the temperature is 180° C. or lower, the difference between the melt viscosities of the polybutylene terephthalate-based resin (A) and the acrylic block copolymer (B) is too large for melt kneading. Therefore, shear force is not applied to the polybutylene terephthalate-based resin (A) to cause insufficient melt kneading and significant drawdown at the die installed on the extruder. As a result, it is difficult to obtain a pelletized polymer composition. Accordingly, the acrylic block copolymer (B) is preferably selected such that the difference between the order-disorder transition temperature thereof and the melting point of the polybutylene terephthalate-based resin (A) used is 45° C. or less.

It is generally thought that the order-disorder transition temperature of a block copolymer depends on the χ-parameter (combination of monomer units of the respective blocks) and the molecular weight, the composition, and the binding manner (block, graft, or star) of the block copolymer, but, in addition thereto, the order-disorder transition temperature is affected by the molecular weight distribution and the molecular weight of each block. For example, in a triblock copolymer (B) having a $(b2_1)$-$(b1)$-$(b2_2)$ block structure, when the molecular weight of the $(b2_1)$ block is different from that of the $(b2_2)$ block and thereby the block copolymer (B) is asymmetric, the influence of the block having a larger molecular weight is higher. Therefore, the order-disorder transition temperature thereof is higher than that of a symmetric block copolymer (B) even if they have the same composition and the same molecular weight. In addition, when the molecular weight distribution is broad due to, for example, polymerization deactivation in the process of living polymerization of the block copolymer (B), the ratio of asymmetric block copolymers is increased by interfusion of polymers including final blocks having a large molecular weight to be living-polymerized. Therefore, the order-disorder transition temperature thereof becomes higher. In addition, even if the acrylic block copolymer (B) is symmetric, when polymerization deactivation occurs in polymerization using a bifunctional living-polymerization initiator, the order-disorder transition temperature is increased by interfusion of polymers including blocks having a large molecular weight at the both ends. Therefore, even if the block copolymers have the same composition and the same molecular weight, they have different order-disorder transition temperatures. Accordingly, in order to regulate the order-disorder transition temperature of the acrylic block copolymer (B) used in the present invention within a specified range, it is important to properly maintain the molecular weight and molecular weight distribution of the polymer block (b2) and to avoid interfusion of, in particular, high-molecular weight polymers.

In the present invention, the amount of the acrylic block copolymer (B) is 33 to 67% by mass and preferably 50 to 67% by mass with respect to the mass of the polymer composition. In such a case, performance derived from the acrylic block copolymer (B) is the main, and therefore the paintability and the flexibility are enhanced, and also in the polymer composition of the present invention, the acrylic block copolymer (B) has an order-disorder transition temperature within the above-mentioned range, and therefore at least the block copolymer (B) is a continuous phase in the formed morphology. As long as the acrylic block copolymer (B) is a continuous phase, the polybutylene terephthalate-based resin (A) may be any of particulate dispersion, cylindrical dispersion, or co-continuous morphology. In addition, the morphology of the polymer composition can be confirmed, after electron staining according to need, by observation of a cross section with a scanning electron microscope or observation of an ultrathin section with a transmission electron microscope.

Furthermore, the polymer composition may contain other polymers and additives, according to need, in addition to the above-described resin (A) and the acrylic block copolymer (B), within a range that does not impair the effect of the present invention. Examples of the additives include mineral oil softeners such as paraffinic oil and naphthenic oil; inorganic fillers for enhancing, for example, heat resistance or weather resistance or for increasing the weight, such as calcium carbonate, talc, carbon black, titanium oxide, silica, clay, barium sulfate, and magnesium carbonate; inorganic or organic fibers for reinforcement, such as glass fibers and carbon fibers; heat stabilizers; antioxidants; light stabilizers; adhesives; tackifiers; plasticizers; antistatic agents; foaming agents; color pigments; flame retardants; anti-agglutination agents; crystal nucleators; and compatibilizer. Among these additives, in order to further enhance the heat resistance and the weather resistance, the addition of a heat stabilizer, an antioxidant, or the like is practically preferred.

The process of preparing the polymer composition in the present invention is not particularly limited. For example, the acrylic block copolymer (B) may be mixed with the above-mentioned other polymer and the additive, according to need, and then with the resin (A). The mixing process is preferably conducted with an extruder, preferably, with a twin-screw extruder for kneading. If a kneading apparatus, such as a kneader, banbury mixer, or mixing roll, is used, the acrylic block copolymer (B), which has a lower melt viscosity, is first highly fluidized, and thereby the polybutylene terephthalate-based resin (A) is hardly sheared and is therefore hardly melted, which may cause insufficient dispersion. It is preferred to properly control the temperature for the kneading depending on, for example, the melting point of the resin (A) used. In usual, the mixing is preferably conducted at a temperature within a range of 180 to 250° C. In particular, in the present invention, since the acrylic block copolymer (B) is highly fluidized and the polybutylene terephthalate-based resin (A) can be finely dispersed, a preferred producing process is that predetermined amounts of the polybutylene terephthalate-based resin (A) and the acrylic block copolymer (B) are melt-kneaded at a temperature equal to or higher than the order-disorder transition temperature of the acrylic block copolymer (B). The polymer composition of the present invention can be thus obtained in an arbitrary form such as a pellet or powder. The polymer composition in a form of, for example, a pellet or powder is suitable for being used as a molding material.

The polymer composition of the present invention is excellent in melt fluidity and therefore can be molded by a molding process that is widely applied to thermoplastic polymers or can be molded using a molding apparatus. For example, molding by an arbitrary molding process, such as injection molding, extrusion molding, compression molding, blow molding, calendar molding, or vacuum molding, is possible to give a molded article having a desired shape, such as a molding, a pipe, a sheet, a film, a fibrous material, or a laminate containing a molded article layer composed of the polymer composition. In particular, the characteristic being excellent in melt fluidity is effectively exerted in injection molding of a thin-plate-like molded article with a thickness less than 1 mm, in which the melt flow is readily interrupted by a skin layer formed by cooling from a mold. Here, the thin-plate-like molded article refers to a molded article at least partially having a planar or curved plate-like portion with a thickness less than 1 mm.

Furthermore, when a composite resin molded product, such as the above-mentioned laminate, is composed of a thermoplastic hard resin layer that maintains the rigidity of the entire composite resin molded product and a layer that is composed of the polymer composition of the present invention, the hard resin layer forms the body or skeleton of the resulting composite molded product, and the layer composed of the polymer composition of the present invention exhibits performance as a grip surface component or a surface skin component. Any resin having a desired mechanical strength can be used as the thermoplastic hard resin. Specifically, for example, polycarbonate; an acrylic resin, a styrene resin such as ABS resin, or polystyrene; a polyester resin; a polyamide resin; or a polyvinyl chloride resin is used.

The composite resin molded product is formed by, for example, coextrusion molding in which two materials of the hard resin and the polymer composition of the present invention are separately extruded using two extruders and are confluent into a single nozzle to form a two-layer molded product by heat fusion of the two materials; two-color molding in which two materials are heat-fused in one mold using an injection molding apparatus equipped with two injection tubes to produce a two-layer molded product; or insert injection molding in which a thermoplastic elastomer composition is injected to a mold in which the hard resin molded product formed with an injection molding apparatus is inserted and positioned to produce a two-layer molded product by heat fusion. In the case of heat fusion or heat adhesion, a composite resin molded product having excellent exfoliation strength can be obtained without using any adhesive.

The above-described molded article of the present invention simultaneously has excellent paintability and high oil resistance and is also excellent in flexibility and therefore can be used in grip materials, for example, commodities, stationery, home-use electric appliances, and sporting goods and also can be used in automotive interior and exterior trims, for example, door handles, side garnishes, instrument panels, console boxes, door trims, and bumpers. Furthermore, the molded article can be used in electric and electronic parts, for example, connectors, switch covers, housings, and containers. The molded article can be thus widely used in various fields and is useful for various purposes.

EXAMPLES

The present invention will be specifically described with reference to the following examples, but is not limited thereto.

In the following examples and comparative examples, the number-average molecular weight (Mn) and the weight-average molecular weight (Mw) of each acrylic block copolymer were determined by gel permeation chromatography (hereinafter, referred to as GPC) as the molecular weights relative to polystyrenes, and molecular weight distribution (Mw/Mn) was calculated based on the above. Furthermore, the compositional ratio of each polymer block of each acrylic block copolymer was determined by $^1$H-NMR ($^1$H-nuclear magnetic resonance) measurement.

The measurement apparatus and conditions used were as follows:

GPC

Apparatus: GPC apparatus "HLC-8020", manufactured by Tosoh Co., Ltd.

Separation column: "TSKgel GMHXL", "G4000HXL", and "G5000HXL" connected in series, manufactured by Tosoh Co., Ltd.

Eluent: tetrahydrofuran

Eluent flow rate: 1.0 mL/min

Column temperature: 40° C.

Detection method: differential refractive index (RI)

$^1$H-NMR

Apparatus: nuclear magnetic resonance apparatus "JNM-LA400", manufactured by JEOL Ltd.

Deuterated solvent: deuterated chloroform

Melt Fluidity of Polybutylene Terephthalate (PBT)-Based Resin (A):

The melt flow rate (MFR) of a PBT resin as a raw material used in the following examples and comparative examples was measured in accordance with JIS K7210 under conditions of a temperature of 250° C. and a load of 2.16 kg.

Order-Disorder Transition Temperature of Acrylic Block Copolymer (B):

The storage elastic moduli G' in the temperature range of 150 to 300° C. of the acrylic block copolymers (B) prepared in the examples were measured using an ARES viscoelasticity measuring system, manufactured by Rheometric Scientific Inc., under a parallel plate mode, a vibration frequency of 6.28 radian/sec, an applied strain of 0.5%, and a temperature increasing rate of 3° C./min. A temperature at which the value of G' has sharply decreased was defined as the order-disorder transition temperature ($T_{ODT}$).

Furthermore, paintability, oil resistance, flexibility, tensile property, fluidity, moldability, and thin-wall moldability of molded articles (test pieces) obtained from polymer compositions were measured and evaluated as follows:

(1) Paintability of Molded Article

Thermoplastic resins or polymer compositions of the following examples or comparative examples were each molded into test pieces having a 110 mm length, a 110 mm width, and a 2.0 mm thickness with an injection molding apparatus at predetermined cylinder temperature and mold temperature. The paintability of the test piece was evaluated in accordance with JIS K5600 under conditions of a cross-cut method. A synthetic resin enamel paint (A-007, manufactured by Asahipen Corp.) was used as a paint, and a cut in a grid pattern (25 squares of 2 mm×2 mm) was formed in a coating such that the cut perforated the coating to reach the basis material. Cellophane tape was attached to the coating and then was detached. The number of the squares remained on the basis material was counted for evaluation.

(2) Oil Resistance of Molded Article

Thermoplastic resins or polymer compositions of the following examples or comparative examples were each molded into a flat plate having a 110 mm length, a 110 mm width, and a 2.0 mm thickness with an injection molding apparatus at predetermined cylinder temperature and mold temperature. The flat plate was cut into a size of a 50 mm length, a 20 mm width, and a 2.0 mm thickness and was evaluated for volume change ratio (ΔV) and weight change ratio (ΔW) before and after immersion in a lubricant, in accordance with JIS K6258. These were defined as indicators of oil resistance.

(3) Flexibility of Molded Article

Thermoplastic resins or polymer compositions of the following examples or comparative examples were each molded into test pieces having a 110 mm length, a 110 mm width, and a 2.0 mm thickness with an injection molding apparatus at predetermined cylinder temperature and mold temperature. Three of the resulting test pieces were overlapped to one another at the central portions thereof to have a thickness of 6.0 mm, and the hardness was measured in accordance with JIS K6253. This was defined as an indicator of flexibility.

(4) Tensile Property of Molded Article

Thermoplastic resins or polymer compositions of the following examples or comparative examples were each molded into a flat plate having a 110 mm length, a 110 mm width, and a 2.0 mm thickness with an injection molding apparatus at predetermined cylinder temperature and mold temperature. The flat plate was punched out into test pieces having a shape of JIS No. 3 for a JIS K6251 test. The test pieces were used for measuring tensile break strength (MPa) and tensile break elongation (%) at a tensile rate of 500 mm/min in accordance with JIS K6251.

(5) Melt Fluidity of Molded Article

The melt flow rates (MFRS) of thermoplastic resins or polymer compositions of the following examples or comparative examples were measured in accordance with JIS K7210 under conditions of a temperature of 230° C. and a load of 2.16 kg. This was defined as an indicator of melt fluidity.

(6) Evaluation Method of Moldability of Composition

Flat plates having a 110 mm length, a 110 mm width, and a 2.0 mm thickness formed by injection-molding were evaluated for the appearance and the feeling.

◯: satisfactory molded article was obtained.

X: defects such as delamination (surface exfoliation) or agglutination of molded article were observed.

(7) Thin-Wall Moldability of Composition

The flow length of each molded article formed by injection-molding using a mold with a cavity having a 200 mm length, a 40 mm width, and 0.5 mm thickness under conditions not to cause deformation near the gate or burr (mold temperature: 50° C., injection rate: 80 mm/sec, cylinder temperature: 250° C.) was measured. The molded article having a flow length shorter than 5 mm was defined as "X".

(8) Morphology of Composition

The central cross section of the resulting pellet was observed with a scanning electron microscope to determine whether the acrylic block copolymer (B) is a continuous phase or a dispersed phase.

Symbols denoting the respective components shown in Table 1 are as follows (hereinafter, the following symbols are used):

PBT (A-1): polybutylene terephthalate resin ("Novaduran 5010R5", manufactured by Mitsubishi Engineering-Plastics Corp.), MFR=22 g/10 min, melting point=225° C.;

PBT (A-2): polybutylene terephthalate resin ("Duranex 2002", manufactured by Polyplastics Co., Ltd.), MFR=23 g/10 min, melting point=225° C.;

PBT (A-3): polybutylene terephthalate resin ("Duranex 500 KP", manufactured by Polyplastics Co., Ltd.), MFR=35 g/10 min, melting point=183° C.;

PBT (A-4): polybutylene terephthalate resin ("Novaduran 5008", manufactured by Mitsubishi Engineering-Plastics Corp.), MFR=76 g/10 min, melting point=225° C.;

PET: polyethylene terephthalate resin ("TR-8550", manufactured by Teijin Chemicals Ltd.);

TPEE: polyester-based elastomer resin ("Hytrel 4047", manufactured by Du Pont-Toray Co., Ltd.); and TPEE-based compound: polyester-based elastomer resin ("Primalloy A1600N", manufactured by Mitsubishi Chemical Corp.).

Acrylic Block Copolymer (B-1):

This is a triblock copolymer of PMMA block-PnBA block-PMMA block (PMMA-b-PnBA-b-PMMA). The Mw of the PMMA block portion is 9900, and the Mw/Mn thereof is 1.11. The Mw of the entire triblock copolymer is 64000, and the Mw/Mn thereof is 1.13. The ratio of each polymer block is PMMA (16% by mass)-PnBA (68% by mass)-PMMA (16% by mass). The order-disorder transition temperature measured by the above-described method was 205° C.

Acrylic Block Copolymer (B-2):

This is a triblock copolymer of PMMA block-PnBA block-PMMA block (PMMA-b-PnBA-b-PMMA). The Mw of the PMMA block portion is 21000, and the Mw/Mn thereof is 1.13. The Mw of the entire triblock copolymer is 132000, and the Mw/Mn thereof is 1.24. The ratio of each polymer block is PMMA (16% by mass)-PnBA (68% by mass)-PMMA (16% by mass). It was revealed that the order-disorder transition temperature was 300° C. or higher because no sharp change in G' was observed in the measurement of the order-disorder transition temperature by the above-described method.

Acrylic Block Copolymer (B-3):

This is a diblock copolymer of PMMA block-PnBA block (PMMA-b-PnBA). The Mw of the PMMA block portion is 4500, and the Mw/Mn thereof is 1.13. The Mw of the entire diblock copolymer is 68000, and the Mw/Mn thereof is 1.21. The ratio of each polymer block is PMMA (7% by mass)-PnBA (93% by mass).

Acrylic Block Copolymer (B-4):

This is a triblock copolymer of PMMA block-PnBA block-PMMA block (PMMA-b-PnBA-b-PMMA). The Mw of one PMMA block ($b2_1$) is 3000, and the Mw/Mn thereof is 1.15. The Mw of the entire triblock copolymer is 64000, and the Mw/Mn thereof is 1.17. The ratio of each polymer block is PMMA ($b2_1$: 6% by mass)-PnBA (68% by mass)-PMMA (26% by mass). It was revealed that the order-disorder transition temperature was 260° C. or higher because no sharp change in G' was observed in the measurement of the order-disorder transition temperature by the above-described method.

Acrylic Block Copolymer (B-5):

This is a diblock copolymer of PMMA block-PnBA block (PMMA-b-PnBA). The Mw of the PMMA block portion is 20000, and the Mw/Mn thereof is 1.15. The Mw of the entire diblock copolymer is 64000. The ratio of each polymer block was PMMA (32% by mass)-PnBA (64% by mass). It was revealed that the order-disorder transition temperature was 300° C. or higher because no sharp change in G' was observed in the measurement of the order-disorder transition temperature by the above-described method.

Example 1

Pellets were mixed at a ratio of 40 parts by weight of the PBT resin (A) and 60 parts by weight of the acrylic block copolymer (B). The mixture was supplied to a twin-screw extruder ("ZSK-25", manufactured by Werner & Pfleiderer Corp.) for producing a pelletized polymer composition by melt-kneading at 230° C., extrusion, and cutting. The melt fluidity (MFR) of the polymer composition was measured by the above-mentioned method to obtain the results shown in the following Table 1. The above-mentioned test pieces were produced using the resulting pelletized polymer composition and were measured and evaluated for the properties to obtain the results shown in the following Table 1.

Example 2

A pelletized polymer composition was produced by melt kneading as in Example 1 except that the mixture ratio was that shown in Table 1. The melt fluidity of the polymer composition was measured. Test pieces were also produced from the pellet and were measured and evaluated for the above-mentioned properties to obtain the results shown in the following Table 1.

Into a mold having a plate-like cavity having a 100 mm length, a 40 mm width, and a 1.0 mm thickness for injection-molding, an ABS resin plate having the same length, the same width, and a 0.5 mm thickness was inserted in advance, and then the above-mentioned pellet was injection-molded into a laminate composed of a layer consisting of the polymer composition of the present invention and the ABS resin layer.

Examples 3 to 5

Pelletized polymer compositions were produced by melt kneading as in Example 1 except that the mixture ratios were those shown in Table 1. The melt fluidity of the polymer compositions was measured, and also test pieces were produced from the pellets and were measured and evaluated for the above-mentioned properties to obtain the results shown in the following Table 1.

Comparative Examples 1 and 2

Pelletized polymer compositions were produced by melt kneading as in Example 1 at a predetermined temperature except that the mixture ratios were those shown in Table 1. The melt fluidity of the polymer compositions was measured, and also test pieces were produced from the pellets and were measured and evaluated for the above-mentioned properties to obtain the results shown in the following Table 1.

Comparative Example 3

Only the acrylic block copolymer (B) that was used in Example 1, not containing the PBT resin (A), was measured for the melt fluidity, and also test pieces were produced therefrom. Furthermore, the test pieces were measured and evaluated for the properties to obtain the results shown in the following Table 1.

Comparative Examples 4 and 5

The melt fluidity of each of the above TPPE resin itself and the TPEE-based compound resin itself was measured, and the above-mentioned test pieces were produced therefrom. Furthermore, the test pieces were measured and evaluated for the properties to obtain the results shown in the following Table 1.

Comparative Example 6

A PET resin, instead of the PBT resin (A), was melt kneaded at a predetermined temperature condition, but because of the high melting point of the PET resin, pelletization thereof was difficult, and a molded article could not be produced.

Comparative Example 7

Injection molding was conducted as in Example 3 except that the acrylic block copolymer (B-2), which had a larger weight-average molecular weight, was used. The molded article had significant delamination (surface exfoliation), and no sample that could be used for physical property evaluation was obtained.

Comparative Example 8

Injection molding was conducted as in Example 1 except that the acrylic block copolymer (B-3), which was a diblock copolymer, was used. Since the molded article had significant agglutination and low material strength, no sample that could be used for physical property evaluation was obtained.

Comparative Examples 9 and 10

Injection molding was conducted as in Example 2 except that the acrylic block copolymer (B-4), which was asymmetric such that one polymer block (b2) had a larger molecular weight, or the acrylic block copolymer (B-5), which was a diblock copolymer containing the polymer block (b2) at the same amount, was used. The molded article had significant delamination, and no sample that could be used for physical property evaluation was obtained.

Comparative Example 11

Melt kneading was conducted as in Example 2 except that the polybutylene terephthalate resin (A-4), which had a high melt flow rate, was used, but the drawdown was significant. Injection molding was conducted, but weighing stability was poor, resulting in poor in moldability.

TABLE 1

|  |  |  | Unit | Example ||||| Comparative Example ||||
|---|---|---|---|---|---|---|---|---|---|---|---|---|
|  |  |  |  | 1 | 2 | 3 | 4 | 5 | 1 | 2 | 3 | 4 |
| Polymer composition | PBT resin (A) | 1 | parts by weight | 60 | 50 | 40 |  |  | 75 | 25 |  |  |
|  |  | 2 |  |  |  |  | 50 |  |  |  |  |  |
|  |  | 3 |  |  |  |  |  | 50 |  |  |  |  |
|  |  | 4 |  |  |  |  |  |  |  |  |  |  |
|  | PET resin |  |  |  |  |  |  |  |  |  |  |  |
|  | Acrylic block copolymer (B) | 1 |  | 40 | 50 | 60 | 50 | 50 | 25 | 75 | 100 |  |
|  |  | 2 |  |  |  |  |  |  |  |  |  |  |
|  |  | 3 |  |  |  |  |  |  |  |  |  |  |
|  |  | 4 |  |  |  |  |  |  |  |  |  |  |
|  |  | 5 |  |  |  |  |  |  |  |  |  |  |
|  | TPEE resin | 4047 |  |  |  |  |  |  |  |  |  | 100 |
|  |  | A1600N |  |  |  |  |  |  |  |  |  |  |
| Physical property | Paintability | cross-cut method (remained squares) | number | 25 | 25 | 25 | 25 | 25 | 25 | 10 | 25 | 25 |
|  | Oil resistance | immersion in lubricant 65° C., 24 hr | ΔV (%) | 1.3 | 2.2 | 3.3 | 4.5 | 7.5 | 0.4 | 8.0 | 8.3 | 4.2 |
|  |  |  | ΔW (%) | 7.4 | 7.0 | 7.3 | 4.6 | 8.2 | 4.7 | 11 | 12 | 8.6 |
|  | Hardness | JIS-A |  | 85 | 83 | 83 | 85 | 85 | 91 | 78 | 65 | 94 |
|  | Tensile property | Break strength | MPa | 20 | 17 | 13 | 21 | 15 | 30 | 9.4 | 9.1 | 14 |
|  |  | Break elongation | % | 90 | 100 | 130 | 110 | 180 | 40 | 250 | 390 | 610 |
|  | MFR | 230° C., 2.16 kg f | g/10 min | 40 | 64 | 95 | 52 | 66 | 17 | 188 | 330 | 35 |
|  | Morphology [block copolymer (B)] |  |  | cont. | cont. | cont. | cont. | cont. | desp. | cont. | — | — |
|  | Moldability |  |  | ○ | ○ | ○ | ○ | ○ | ○ | ○ | ○ | ○ |
|  | Thin-wall moldability |  | mm | 75 | 125 | 145 | 100 | 130 | 30 | 170 | 200 | 10 |

|  |  |  | Unit | Comparative Example ||||||
|---|---|---|---|---|---|---|---|---|---|
|  |  |  |  | 5 | 6 | 7 | 8 | 9 | 10 | 11 |
| Polymer composition | PBT resin (A) | 1 | parts by weight |  |  | 40 | 40 | 50 | 50 |  |
|  |  | 2 |  |  |  |  |  |  |  |  |
|  |  | 3 |  |  |  |  |  |  |  |  |
|  |  | 4 |  |  |  |  |  |  |  | 50 |
|  | PET resin |  |  |  |  | 40 |  |  |  |  |
|  | Acrylic block copolymer (B) | 1 |  |  |  | 60 |  |  |  | 50 |
|  |  | 2 |  |  |  |  | 60 |  |  |  |
|  |  | 3 |  |  |  |  |  | 60 |  |  |
|  |  | 4 |  |  |  |  |  |  | 50 |  |
|  |  | 5 |  |  |  |  |  |  |  | 50 |
|  | TPEE resin | 4047 |  |  |  |  |  |  |  |  |
|  |  | A1600N |  | 100 |  |  |  |  |  |  |
| Physical property | Paintability | cross-cut method (remained squares) | number | 0 | — | — | — | — | — | 25 |
|  | Oil resistance | immersion in lubricant 65° C., 24 hr | ΔV (%) | 64 | — | — | — | — | — | 4.5 |
|  |  |  | ΔW (%) | 70 | — | — | — | — | — | 5.5 |
|  | Hardness | JIS-A |  | 70 | — | — | — | — | — | 88 |
|  | Tensile property | Break strength | MPa | 7.8 | — | — | — | — | — | 19 |
|  |  | Break elongation | % | 810 | — | — | — | — | — | 100 |
|  | MFR | 230° C., 2.16 kg f | g/10 min | 5.7 | — | 4.2 | >400 | 7.3 | 5.2 | 105 |
|  | Morphology [block copolymer (B)] |  |  | — | cont. | desp. | cont. | desp. | desp. | cont. |
|  | Moldability |  |  | ○ | X | X | X | X | X | X |
|  | Thin-wall moldability |  | mm | 5 | X | X | X | X | X | 150 |

It is confirmed from the results shown in Table 1 that the molded articles obtained from the polymer compositions according to the present invention in Examples 1 to 3 have lower oil resistance, but are excellent in flexibility, compared to those in the composition composed of 75 parts by weight of the PBT resin and 25 parts by weight of the acrylic block copolymer in Comparative Example 1. In addition, it is confirmed that the paintability and the oil resistance are excellent compared to those in the composition composed of 25 parts by weight of the PBT resin and 75 parts by weight of the acrylic block copolymer of Comparative Example 2. Furthermore, it is confirmed that the oil resistance is excellent compared to that in the composition composed of only the acrylic block copolymer of Comparative Example 3; the oil resistance and the flexibility are excellent compared to those in the composition composed of only the TPEE resin of Comparative Example 4; and the paintability and the oil resistance are excellent compared to the composition composed of only the TPEE-based compound resin of Comparative Example 5.

It is confirmed that the polymer composition of Example 2 has an order-disorder transition temperature or a block structure of the acrylic block copolymer (B) within the ranges specified in the present invention and thereby is excellent in moldability, in particular, in thin-wall moldability compared to those in Comparative Examples 6 to 9, which do not satisfy these requirements.

The invention claimed is:

1. A polymer composition comprising 33 to 67% by mass of a polybutylene terephthalate-based resin (A) and 67 to 33% by mass of an acrylic block copolymer (B), wherein
   the polybutylene terephthalate-based resin (A) has a melt flow rate of 10 to 40 g/10 min at 250° C. and a 2.16 Kg load; and
   in the acrylic block copolymer (B),
   the weight-average molecular weight is 50000 to 100000,
   the block structure is a triblock structure in which two polymer blocks (b2) comprising a methacrylic ester unit are bonded to the both ends of a polymer block (b1) comprising an acrylic ester unit, the total mass of the polymer block (b2) is 20 to 35% by mass with respect to the acrylic block copolymer (B), the order-disorder transition temperature of the block copolymer (B) is 180 to 230° C., and the polybutylene terephthalate-based resin (A) is dispersed in the block copolymer (B).

2. A process of producing the polymer composition according to claim 1, comprising:

melt-kneading a polybutylene terephthalate-based resin (A) and an acrylic block copolymer (B) at a temperature equal to or higher than the order-disorder transition temperature of the acrylic block copolymer (B).

3. A molded article comprising the polymer composition according to claim 1.

4. The molded article according to claim 3, being an injection-molded article.

5. The injection-molded article according to claim 4, having a planar or curved portion with a thickness less than 1 mm.

6. The molded article according to claim 3, being a grip surface material.

7. The molded article according to claim 3, being an automotive interior or exterior trim material.

8. A laminate comprising a layer composed of the polymer composition according to claim 1 and a layer composed of a hard resin.

9. The polymer composition according to claim 1, wherein the polybutylene terephthalate-based resin (A) is present in an amount of from 33 to 50% by mass.

10. The polymer composition according to claim 1, wherein the acrylic block copolymer (B) is present in an amount of from 50 to 67% by mass.

11. The polymer composition according to claim 1, wherein the polybutylene terephthalate-based resin (A) has a melt flow rate of 20 to 40 g/10 min at 250° C. and a 2.16 Kg load.

12. The polymer composition according to claim 1, wherein the weight-average molecular weight of the polymer block (b) is from 30,000 to 80,000.

13. The polymer composition according to claim 1, having a tensile break strength of 15-21 MPa measured according to JIS K6251 on a test piece having a shape of JIS No. 3.

14. The polymer composition according to claim 1, having a melt flow rate of from 52 to 95 g/10 min at 250° C. and a 2.16 Kg load.

15. The polymer composition according to claim 1, wherein the acrylic block copolymer (B) is a triblock copolymer of structure PMMA block-PnBA block-PMMA block.

16. The polymer composition according to claim 1, wherein the acrylic block copolymer (B) comprises a PMMA block.

17. The polymer composition according to claim 1, wherein the acrylic block copolymer (B) comprises a n-butyl acrylate block.

* * * * *